United States Patent [19]
Rickman

[11] Patent Number: 5,303,596
[45] Date of Patent: Apr. 19, 1994

[54] PIEZOELECTRIC AIRBLAST GAGE MOUNTING DEVICE FOR USE IN HIGH SHOCK ENVIRONMENTS

[75] Inventor: Denis D. Rickman, Clinton, Miss.

[73] Assignee: The United States of America as represented by the United States Army Corps of Engineers, Washington, D.C.

[21] Appl. No.: 65,151

[22] Filed: May 21, 1993

[51] Int. Cl.$^5$ .................................................. G01L 9/00
[52] U.S. Cl. ......................................... 73/754; 73/431; 73/756; 73/DIG. 4
[58] Field of Search .................... 73/36, 167, 147, 700, 73/709, 714, 756, 431, DIG. 4

[56] References Cited

U.S. PATENT DOCUMENTS

| | | | |
|---|---|---|---|
| 2,569,987 | 10/1951 | Frondel | 73/DIG. 4 |
| 2,799,788 | 7/1957 | Fitzgerald et al. | 73/754 |
| 3,336,807 | 8/1967 | Van Lint et al. | 73/754 |
| 3,337,844 | 8/1967 | Baltakis | 73/753 |
| 5,095,741 | 3/1992 | Bartig et al. | 73/754 |

Primary Examiner—Donald O. Woodiel
Attorney, Agent, or Firm—Luther A. Marsh

[57] ABSTRACT

A mounting assembly for a piezoelectric airblast gage includes a steel insert into which the gage is screwed. The insert is contained within a steel housing to provide a protective enclosure for the piezoelectric gage and its associated electronics. The insert is clamped inside the housing by means of a steel clamping ring which is bolted to the housing. Gaskets surround the insert on all surfaces which might come in contact with the steel housing or clamping ring. Prior to final assembly, the external electronics package for the piezoelectric gage is shock-isolated by filling the cavity beneath the insert with a shock-mitigating substance. Once fully assembly, the top of the insert and the piezoelectric gage are flush with the top of the housing.

7 Claims, 2 Drawing Sheets

PIEZOELECTRIC AIRBLAST GAGE MOUNTING DEVICE FOR USE IN HIGH SHOCK ENVIRONMENTS

BACKGROUND OF THE INVENTION

The Defense Nuclear Agency (DNA) sponsors continuing efforts to evaluate the survivability of structures under loading conditions produced by nuclear detonations. High-explosive charges are typically used to simulate the nuclear loading phenomena on smallscale structures. The most widely used simulation method is the High-Explosive Simulation Technique, or HEST. A new simulation method employs Dilute Explosive Tile (DET) as the explosive source.

High-explosive charges used in nuclear simulators are designed to produce a specified level of airblast loading. To properly assess the validity of the simulation, it is necessary to measure the airblast pressure and the impulse histories produced by the charge detonations. The present invention relates to a mounting assembly for a piezoelectric airblast gage which enables the gage to provide accurate airblast measurements without being destroyed in high shock environments produced by explosions.

BRIEF DESCRIPTION OF THE PRIOR ART

Present commercially available pressure transducers either do not have sufficient measurement range or are not shock-hardened enough to survive in the harsh environment produced by the simulator detonations. In these situations, Hopkinson Bar airblast gages have been used to obtain peak airblast data and early-time (up to 1.5 msec after shock arrival) impulse data.

Piezoelectric pressure gages, such as those manufactured by PCB, Inc., are capable of measuring peak pressures of up to 120 ksi, and can capture signal rise-times of approximately 3 $\mu$sec. However, these gages have not been successfully used on past HEST or DET tests, due primarily to electrical failures related to the severe shock environment. The mounting devices currently used do not provide shock-isolation of the delicate electronics associated with piezoelectric gages and do not provide adequate electrical isolation of the gage, thus creating undesirable ground loops which cause electrical noise on the recorded airblast measurements.

Investigations of past failures of piezoelectric airblast gages indicated that a new mounting technique would have to be devised that would provide shockisolation of sensitive gage electronics and electrical isolation of the sensing element. The piezoelectric airblast gage (PAG) mount of the present invention was designed to enable high-range piezoelectric airblast gages to survive in the high shock environments produced by explosions.

SUMMARY OF THE INVENTION

Accordingly, it is a primary object of the invention to provide an improved mounting assembly for a piezoelectric airblast gage including a housing containing a longitudinal chamber having an upper portion and a lower portion whose diameter is less than that of the upper portion. A mounting insert is arranged in the housing chamber upper portion and clamped in position by an annular mounting ring. The insert contains an axial bore within which the gage is mounted via a threaded connection. The upper end of the gage is flush with the upper surface of the insert. The electronic circuitry connected with the gage via a cable is suspended within the lower portion of the housing chamber. A shock-absorbing or mitigating material is arranged within the housing chamber lower portion and surrounds the electronic circuitry. When the housing is fixed within a structure such as a concrete wall and an explosive is detonated, the mounting assembly isolates the gage and electronics from explosive shockwaves enabling the gage to provide accurate airblast measurements without destruction in a high shock environment.

The assembly preferably includes gaskets formed of polytetrafluoroeteylene material between the insert and the clamping ring and the housing. The gaskets serve to electrically isolate the insert and gage to reduce electrical noise on the recorded measurements.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
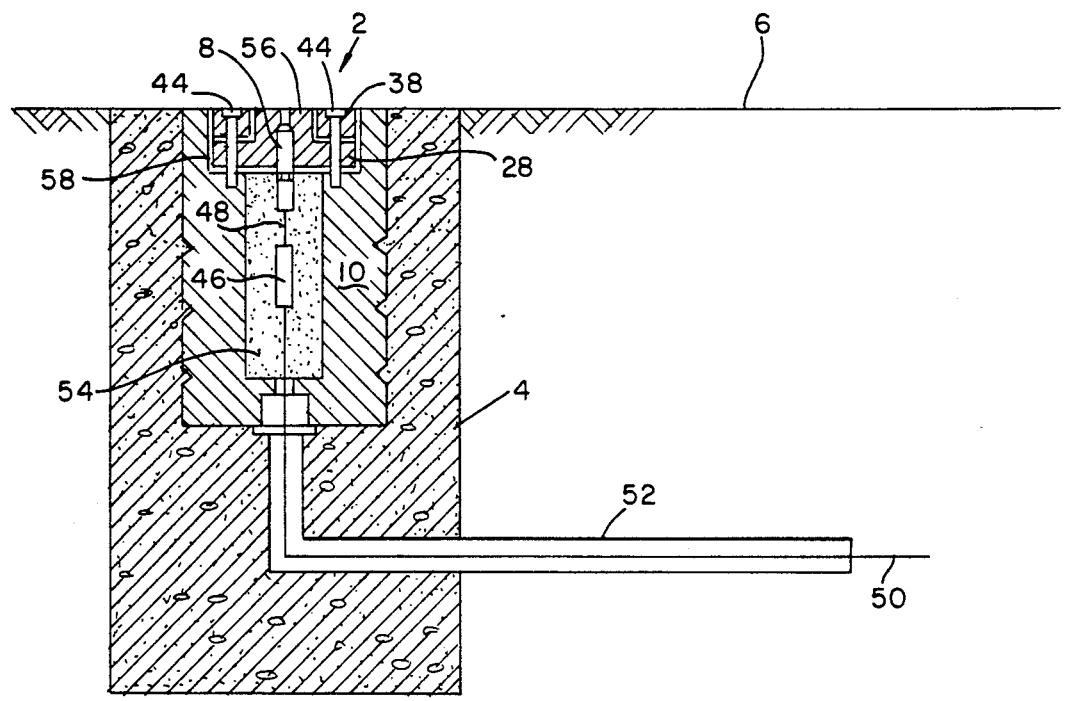
FIG. 1 is a partial sectional view of the piezoelectric airblast gage mounting assembly according to the invention.

The piezoelectric airblast gage mounting device according to the invention will now be described. As shown in FIG. 1, the device comprises an assembly 2 which is preferably mounted in a concrete structure 4 embedded in the ground 6 at a test blast site. The assembly supports a piezoelectric airblast gage 8, the top of which is arranged flush with the ground surface for measuring airblasts from explosions at the blast site.

Figure 2:
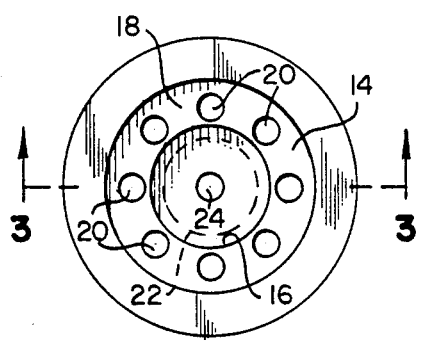
FIGS. 2 and 3 are top plan and front sectional views, respectively, of the housing of the assembly of FIG. 1.
Figure 3:
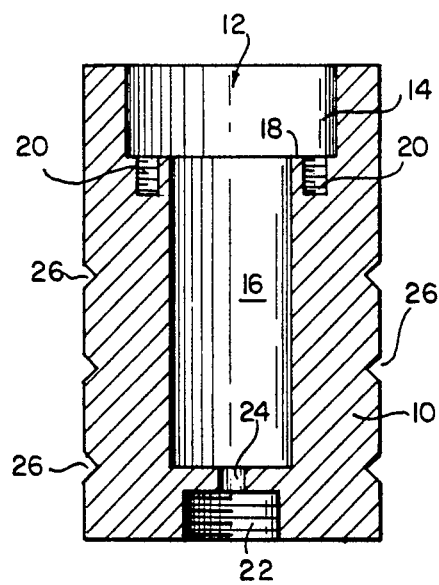

The assembly includes a steel housing 10 which is shown in greater detail in FIGS. 2 and 3. The housing, which preferably has a cylindrical configuration, contains a longitudinal chamber 12 having an upper portion 14 and a lower portion 16. The chamber upper and lower portions are also cylindrical in configuration. The chamber lower portion 16 has a diameter less than that of the upper portion 6 to define a seat 18 which contains a plurality of radially arranged threaded openings 20. The bottom of the housing 10 contains a larger threaded opening 22 connected with the chamber lower portion 16 via a duct 24 for a purpose to be described below. The outer surface of the housing contains a plurality of circumferential grooves 26 which facilitate bonding of the housing to the concrete structure 4.

Referring once again to FIG. 1, the gage mounting assembly also includes a steel mounting insert 28 arranged within the housing chamber upper portion 14. The insert is shown in detail in FIGS. 4 and 5. It includes a cylindrical base portion 30 having an outer diameter corresponding with the diameter of the housing upper portion and a raised top portion 32. The mounting insert contains an axial through bore 34 threaded at its lower end and configured to receive the piezoelectric airblast gage 8 as shown in FIG. 1. More particularly, the gage includes a threaded portion which mates with the threaded portion of the insert bore to mount the gage within the insert. For proper operation of the gage, it is screwed into the insert a sufficient amount so that the top of the gage is flush with the top of the insert.

Figure 4:
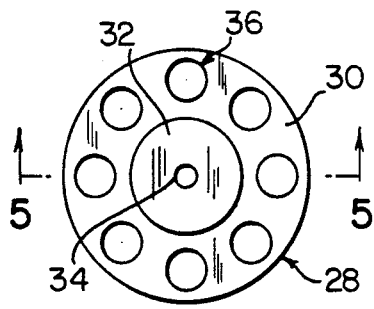
FIGS. 4 and 5 are top plan and front sectional views, respectively, of the mounting insert of the assembly.
Figure 5:
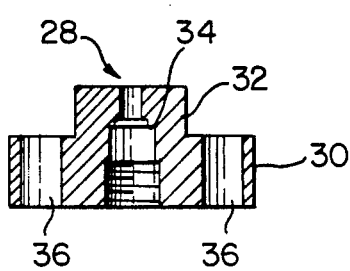

The base portion 30 of the insert contains a plurality of through-openings 36 radially arranged (as shown in FIG. 4) for alignment with the threaded openings 20 in the housing seat portion in FIG. 1.

Figure 6:
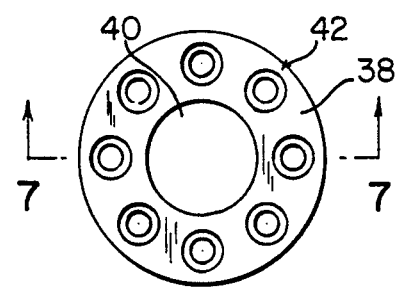
FIGS. 6 and 7 are top plan and front sectional views, respectively, of the clamping ring of the assembly.
Figure 7:
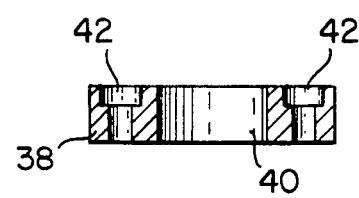

In order to clamp the insert 28 within the housing chamber upper portion 14, there is provided an annular clamping ring 38 formed of steel. As shown in detail in FIGS. 6 and 7, the ring contains a central opening 40 and a plurality of radially arranged openings 42. The central opening is configured to receive the raised top portion 32 of the mounting insert 28 and the radially arranged openings 42 are aligned with corresponding openings 20, 36 in the housing and insert, respectively, for receiving clamping screws 44 as shown in FIG. 1.

The piezoelectric airblast gage 8 includes encapsulated electronic circuitry 46 which is suspended from and electrically connected with the gage via a coaxial cable 48 as shown in FIG. 1. Signals from the gage and circuitry are transmitted to a remote location via a cable 50 which passes through tubing 52 arranged in the concrete structure. With the gage 8 screwed into the insert 28 and with the insert clamped in the housing, the electronic circuitry is suspended within the housing chamber lower portion 16. In order to prevent vibration of the electronic circuitry, the housing chamber lower portion is filled with a shock-dissipating material 54, such as a bi-wax material, which completely surrounds the electronic circuitry. With the gage secured in the mounting insert and the electronic circuitry suspended in the shock-dissipating material, the gage is able to withstand high order shocks (greater than 80 ksi) resulting from explosive detonation.

In addition to mechanical isolation from airblast shocks described above, the gage mounting assembly of the invention also provides electrical isolation through use of first and second gaskets 56, 58 arranged between the clamp ring 38 and the insert 28 and between the insert and the housing 10, respectively.

Figure 8:
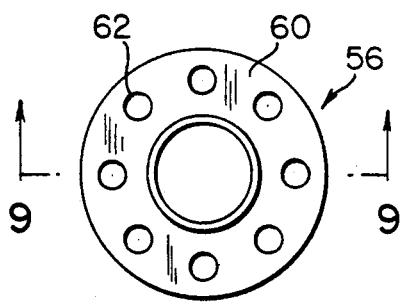
FIGS. 8 and 9 are top plan and front sectional views, respectively, of a first gasket of the assembly.
Figure 9:
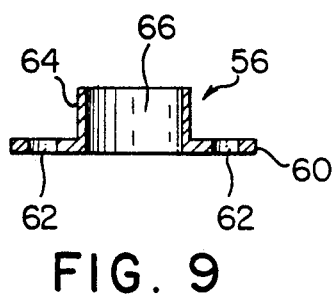

The first gasket 56 is shown in FIGS. 8 and 9 and includes a base portion 60 containing a plurality of radially arranged openings 62 for receiving the clamping screws and a raised portion 64 containing an axial opening 66 for receiving the top portion 32 of the insert as shown in FIG. 1.

Figure 10:
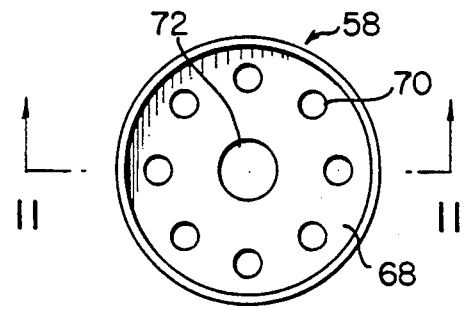
FIGS. 10 and 11 are top plan and front sectional views, respectively, of a second gasket of the assembly.
Figure 11:
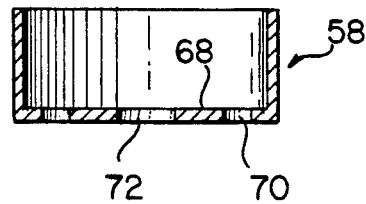

The second gasket 58 has a tubular configuration as shown in FIGS. 10 and 11, and includes a bottom wall 68 containing a plurality of radially arranged openings 70 for receiving the clamping screws and a central opening 72 for receiving the gage as shown in FIG. 1.

Both gaskets are formed of polytetrafluoroethylene material and serve to shield the gage and electronic circuitry from electrical noise.

During installation, the housing is arranged or cast at a desired location in a concrete pour. The tubing 52 is installed and the cable 50 is pulled through the tubing into the bottom of the housing and secured thereto with a protective cap. The top of the housing is then covered and the concrete is poured.

After curing of the concrete, the housing cover is removed and the interior of the housing is cleaned. Next the gasket 58 is inserted in the housing chamber upper portion. The gage is screwed into the insert with the top of the gage (where the sensing element is located) being flush with the top of the insert. The cable from the gage is connected with the cable in the bottom of the housing, and the chamber lower portion is filled with shock-mitigating material. The insert, gage, and electronic circuitry are lowered into the housing with care being taken to insure that the gage cables and electronic circuitry are completely encased in the shock-mitigating material and that the cables are not creased or cut.

The gasket 56 is then placed over the insert, and the clamp ring 28 is placed over the gasket 56. The clamp screws are inserted in the ring and pass through the gaskets and insert openings for connection with the threaded openings 20 in the housing.

The mounting assembly enables the gage to measure full-duration airblast pressures of over 80 ksi while also isolating the gage from electrical noise to reduce disturbances on recorded measurements.

It will be appreciated by those skilled in the art that the housing, insert and clamping ring may be formed of suitable materials other than steel and that the gaskets may be formed of any suitable electrically isolating material.

While in accordance with the provisions of the patent statute and the preferred forms and embodiments have been illustrated and described, it will be apparent to those of ordinary skill in the art that various changes and modifications may be made without deviating from the inventive concepts set forth above.

What is claimed is:

1. A mounting assembly for a piezoelectric airblast gage and electronic circuitry, comprising
   (a) a housing containing a longitudinal cylindrical chamber including an upper portion having a first diameter and a lower portion having a second diameter;
   (b) a mounting insert arranged within said housing chamber upper portion, said insert containing an axial bore within which the gage is mounted, the upper end of the gage being flush with the upper surface of said insert and the electronics being suspended from the gage in said housing chamber lower portion;
   (c) means for clamping said insert within said housing chamber upper portion; and
   (d) means for mitigating mechanical shocks arranged in said housing chamber lower portion, whereby when said housing is fixed within a structure and an explosive is detonated in the vicinity of the gage, the mounting assembly isolates the gage and electronics from shockwaves produced by the detonated explosive enabling the gage to provide accurate airblast measurements without destruction in high shock environment.

2. A mounting assembly as defined in claim 1, and further comprising gasket means arranged between said housing and said insert and between said insert and said clamping means for electrically isolating said insert and the gage.

3. A mounting assembly as defined in claim 2, wherein said clamping means comprises an annular clamping ring containing a plurality of openings and a plurality of clamping screws which pass through aligned openings in said insert and said gasket means for connection with threaded openings contained in said housing.

4. A mounting assembly as defined in claim 3, wherein said housing, said insert, and said clamping ring are formed of steel.

5. A mounting assembly as defined in claim 3, wherein said gasket means is formed of polytetrafluorethylene material.

6. A mounting assembly as defined in claim 3, wherein said mechanical shock mitigating means comprises a bi-wax compound.

7. A mounting assembly as defined in claim 6, wherein said housing includes an outer surface containing a plurality of circumferential grooves for facilitating bonding of the said housing within a concrete structure.

* * * * *